(12) United States Patent
Behzadpour et al.

(10) Patent No.: US 11,623,733 B2
(45) Date of Patent: Apr. 11, 2023

(54) BEAD-STIFFENED MOVABLE SURFACES

(71) Applicant: The Boeing Company, Chicago, IL (US)

(72) Inventors: Forouzan Behzadpour, Woodinville, WA (US); Waeil M. Ashmawi, Bellevue, WA (US); Sahrudine Apdalhaliem, Seattle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/376,140

(22) Filed: Jul. 14, 2021

(65) Prior Publication Data

US 2022/0033061 A1 Feb. 3, 2022

Related U.S. Application Data

(60) Provisional application No. 63/057,944, filed on Jul. 29, 2020.

(51) Int. Cl.
*B64C 9/00* (2006.01)
*B64F 5/10* (2017.01)
*B64C 3/18* (2006.01)
*B64C 3/26* (2006.01)

(52) U.S. Cl.
CPC ............... *B64C 9/00* (2013.01); *B64C 3/185* (2013.01); *B64C 3/187* (2013.01); *B64C 3/26* (2013.01); *B64F 5/10* (2017.01); *B64C 2009/005* (2013.01)

(58) Field of Classification Search
CPC ............... B64C 9/16; B64C 9/18; B64C 9/20
See application file for complete search history.

(56) References Cited

U.S. PATENT DOCUMENTS

| | | | |
|---|---|---|---|
| 3,775,238 A * | 11/1973 | Lyman | B64C 3/00 428/167 |
| 3,995,081 A | 11/1976 | Fant | |
| 6,244,542 B1 * | 6/2001 | Young | B64C 9/02 244/225 |
| 2012/0052247 A1 * | 3/2012 | Pook | B29C 66/4722 156/60 |
| 2020/0086970 A1 | 3/2020 | Behzadpour | |

FOREIGN PATENT DOCUMENTS

WO   WO2016023056   2/2016

OTHER PUBLICATIONS

EPO, Extended European Search Report, appl. No. EP2118 8215, dated Jan. 4, 2022.

* cited by examiner

*Primary Examiner* — Timothy D Collins
*Assistant Examiner* — Eric Acosta

(57) ABSTRACT

A movable surface of an aircraft has a front spar extending along a spanwise direction between opposing movable surface ends. The movable surface also includes a plurality of ribs defining a plurality of bays between adjacent pairs of the ribs. Each rib extends between the front spar and a trailing edge portion of the movable surface. The movable surface further includes an upper and a lower skin panels coupled to the ribs and the front spar. In addition, the bull surface includes a plurality of bead stiffeners coupled to an inner surface of at least one of the upper skin panel and the lower skin panel. The bead stiffeners within the bays are spaced apart from each other and are oriented non-parallel to the front spar and have a bead stiffener cap having opposing cap ends respectively locate proximate the front spar and the trailing edge portion.

20 Claims, 12 Drawing Sheets

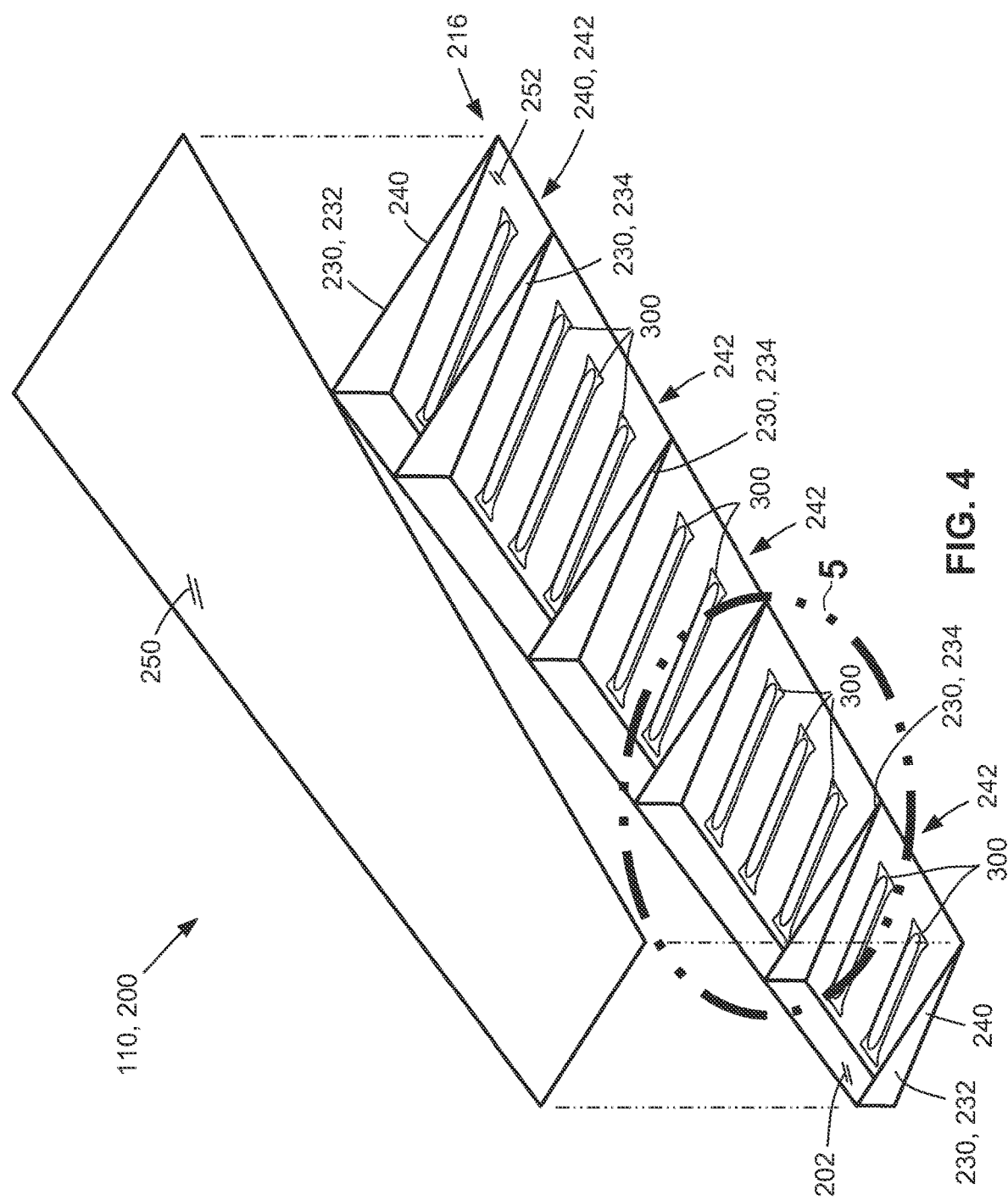

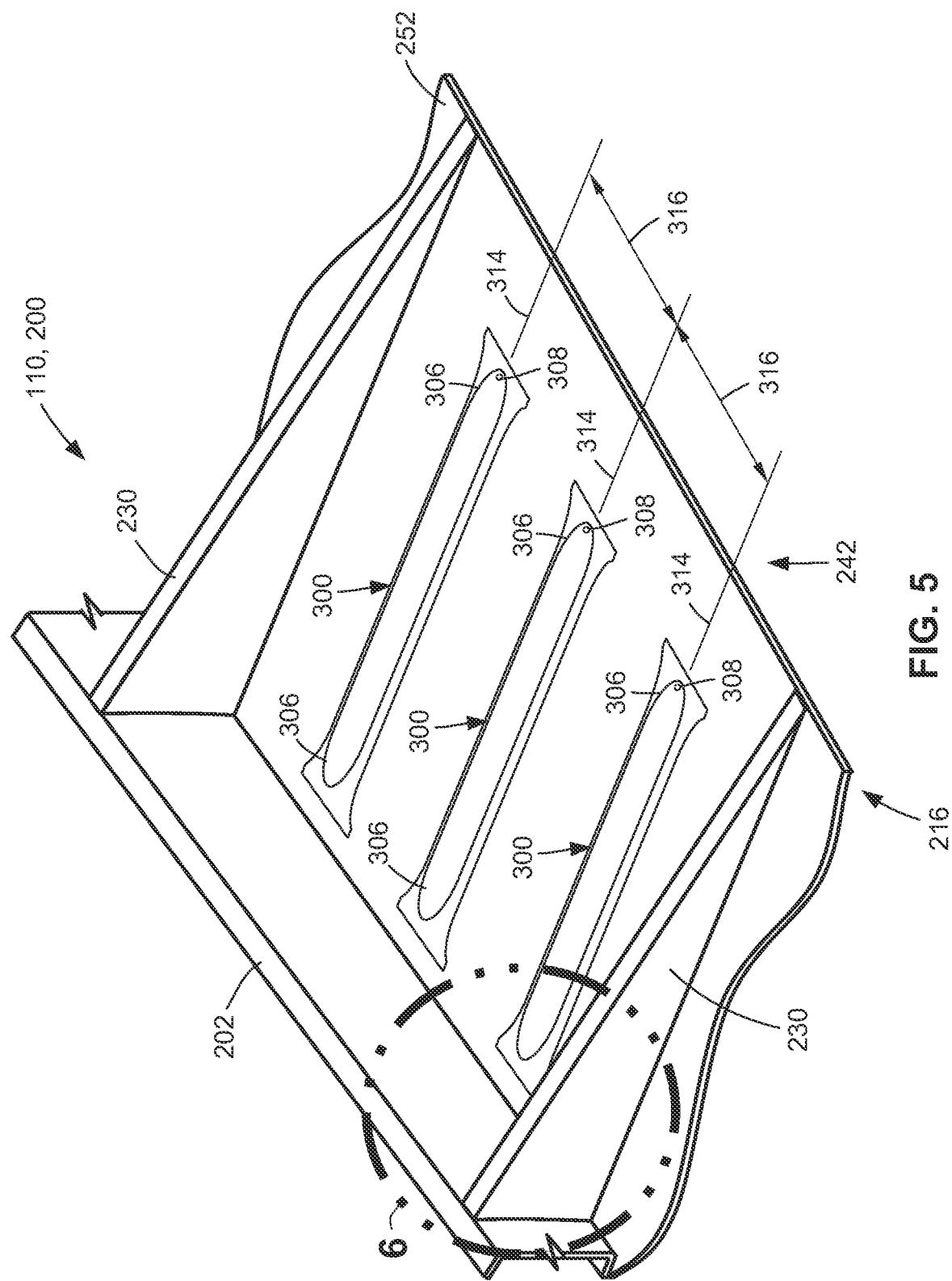

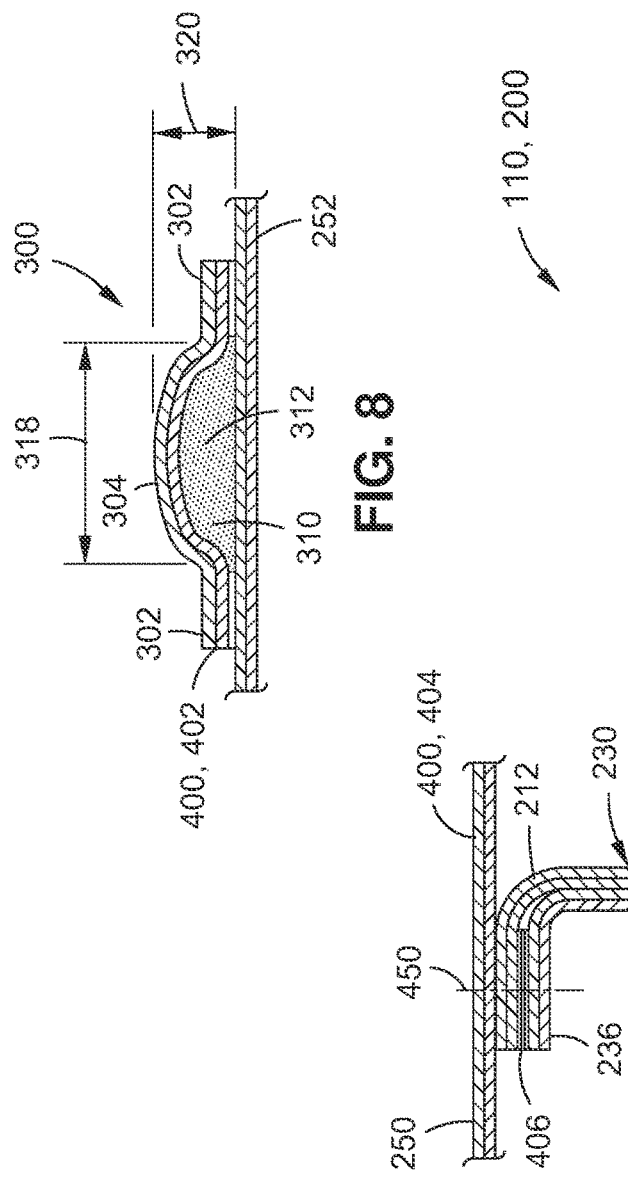
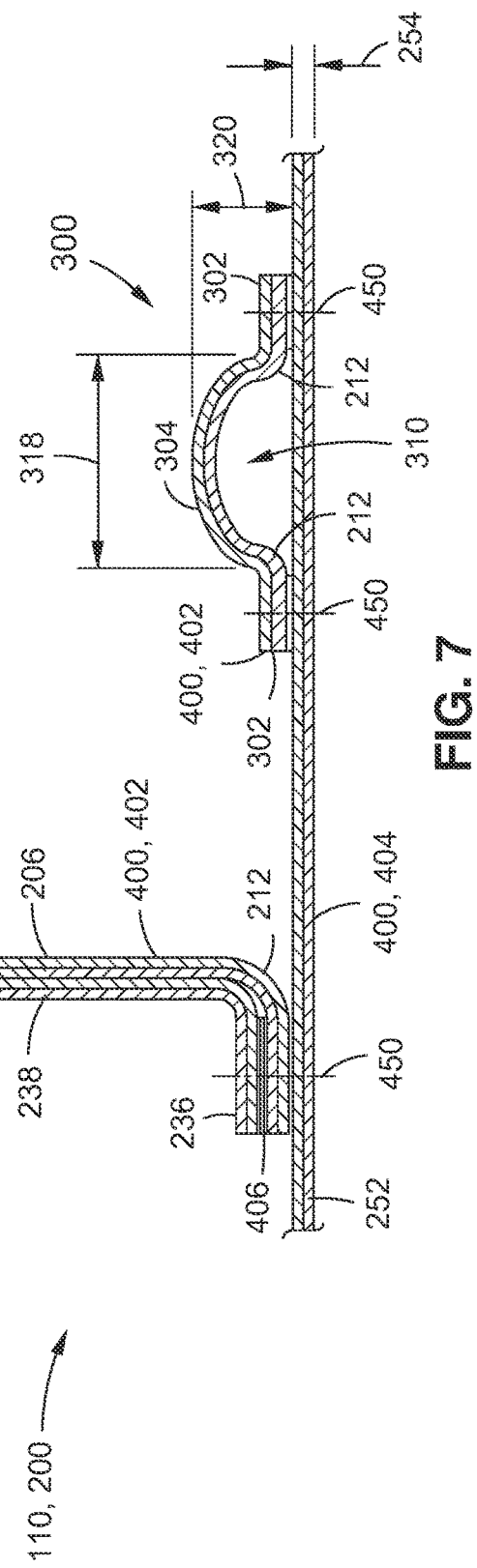

600 — PROVIDING A MOVABLE SURFACE, INCLUDING:
- A FRONT SPAR EXTENDING BETWEEN OPPOSING MOVABLE SURFACE ENDS;
- A PLURALITY OF RIBS LOCATED AT SPACED INTERVALS BETWEEN THE MOVABLE SURFACE ENDS AND DEFINING A PLURALITY OF BAYS BETWEEN ADJACENT PAIRS OF THE RIBS, EACH RIB EXTENDING BETWEEN THE FRONT SPAR AND A TRAILING EDGE PORTION OF THE MOVABLE SURFACE AND ORIENTED GENERALLY PARALLEL TO A CHORDWISE DIRECTION OF THE MOVABLE SURFACE;
- AN UPPER SKIN PANEL AND A LOWER SKIN PANEL EACH COUPLED TO THE PLURALITY OF RIBS AND THE FRONT SPAR;
- A PLURALITY OF BEAD STIFFENERS COUPLED TO AN INNER SURFACE OF AT LEAST ONE OF THE UPPER SKIN PANEL AND THE LOWER SKIN PANEL WITHIN ONE OR MORE OF THE BAYS, THE BEAD STIFFENERS WITHIN THE ONE OR MORE BAYS BEING SPACED APART FROM EACH OTHER AND ORIENTED NON-PARALLEL TO THE FRONT SPAR AND HAVING A BEAD STIFFENER CAP HAVING OPPOSING CAP ENDS RESPECTIVELY LOCATED PROXIMATE THE FRONT SPAR AND THE MOVABLE SURFACE TRAILING EDGE — 602

604 — PLACING THE MOVABLE SURFACE IN A NON-LOADED CONDITION

606 — PLACING THE MOVABLE SURFACE IN A LOADED CONDITION

FIG. 18

BEAD-STIFFENED MOVABLE SURFACES

CROSS-REFERENCE TO RELATED APPLICATIONS

The application claims priority to U.S. Provisional Application Ser. No. 63/057,944, filed Jul. 29, 2020, which is incorporated herein by reference in its entirety.

FIELD

The present disclosure relates generally to movable surfaces of an aircraft and, more particularly, to a movable surface having skin panels that are stiffened with discrete bead stiffeners.

BACKGROUND

Aircraft typically include several types of flight control surfaces (i.e., movable surfaces) for controlling the direction and orientation of the aircraft during flight. For example, the wings of an aircraft may include ailerons for roll control of the aircraft about a longitudinal axis. The ailerons may be pivotably coupled to the wings, and may be deflected up and/or down to rotate the aircraft about the longitudinal axis for changing the bank angle of the aircraft to initiate a turn, or to return the aircraft to a wings-level orientation. The tail portion of an aircraft may include an elevator for pitch control of the aircraft about a lateral axis. An elevator may be pivotably coupled to a horizontal stabilizer, and may be deflected up and down to rotate the aircraft about the lateral axis for changing the pitch angle of the aircraft to a nose-up or nose-down orientation for respectively climbing or descending. The tail portion may also include a rudder for yaw control of the aircraft about a vertical axis. The rudder may be pivotably coupled to a vertical stabilizer, and may be deflected right and left to rotate the aircraft about the vertical axis for controlling the yaw orientation of the aircraft in coordination with deflection of the ailerons during turning of the aircraft.

Conventionally, flight control surfaces (i.e., movable surfaces) are manufactured in one of several different structural arrangements. For example, one structural arrangement for an aileron may be described as a honeycomb-sandwich arrangement in which composite (e.g., carbon-fiber) upper and lower skin panels are interconnected by a full-depth honeycomb core. Although the honeycomb-sandwich arrangement provides for a high-strength structure, the honeycomb core presents challenges associated with manufacturing and repairability. Another example of a structural arrangement for a movable surface (e.g., an aileron) is a multi-rib arrangement that combines the use of titanium and composite materials. Although providing for a high-strength structure, the multi-rib arrangement is heavy, complex, and time-consuming to manufacture due to the large number of parts and the different types of assembly operations that are required due to the mixed use of materials. In addition, the multi-rib arrangement presents challenges associated with repairability. For example, repair of a movable surface having a multi-rib arrangement may entail replacement of the entire movable surface.

As can be seen, there exists a need in the art for a movable surface (e.g., a flight control surface) that avoids the above-mentioned challenges associated with the manufacturing, repairability, and weight of conventional movable surfaces.

SUMMARY

The above-noted needs associated with movable surfaces of an aircraft are specifically addressed by the present disclosure which provides a movable surface having a front spar that extends along a spanwise direction between opposing movable surface ends. In addition, the movable surface includes a plurality of ribs located at spaced intervals between the movable surface ends and which define a plurality of bays between adjacent pairs of the ribs. Each rib extends between the front spar and a trailing edge portion of the movable surface. The movable surface also includes an upper skin panel and a lower skin panel coupled to the plurality of ribs and the front spar. Additionally, the movable surface includes a plurality of bead stiffeners coupled to an inner surface of at least one of the upper skin panel and the lower skin panel. The bead stiffeners within the bays are spaced apart from each other and are oriented non-parallel to the front spar and have a bead stiffener cap having opposing cap ends respectively locate proximate the front spar and the trailing edge portion.

Also disclosed is a method of manufacturing a movable surface of an aircraft. The method includes coupling a plurality of ribs to a front spar of the movable surface. As mentioned above, each rib extends between the front spar and a trailing edge portion of the movable surface. The front spar extends along a spanwise direction between opposing movable surface ends of the movable surface. The ribs are located at spaced intervals between the movable surface ends and define a plurality of bays between adjacent pairs of the ribs. The method further includes coupling a plurality of bead stiffeners to an inner surface of at least one of an upper skin panel and a lower skin panel of the movable surface. The bead stiffeners within one or more of the bays are spaced apart from each other, and have a bead stiffener cap having opposing cap ends respectively located proximate the front spar and the trailing edge portion. The method also includes coupling the upper skin panel and the lower skin panel to the plurality of ribs and to the front spar.

In addition, disclosed is a method of loading a movable surface of an aircraft. The method includes providing a movable surface as described above. The method additionally includes placing the movable surface in a non-loaded condition, and placing the movable surface in a loaded condition. The non-loaded condition is associated with the aircraft being substantially non-moving and under a ground static loading in which the movable surface is subjected to gravitational force due to a structural mass of the movable surface. The loaded condition is associated with the aircraft in motion in which the movable surface is subjected to loads such as aerodynamic loads and/or loads due to gravitational force or inertial force due to the structural mass of the movable surface.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 4 is a partially-exploded perspective view of the aileron of FIG. 3 showing the upper skin panel separated from the aileron;

FIG. 5 is a magnified view of the portion of the aileron identified by reference numeral 5 of FIG. 4, and showing a plurality of discrete bead stiffeners coupled to an inner surface of the lower skin panel within a bay defined between two of the ribs of the aileron;

FIG. 7 is a sectional view of a portion of the aileron taken along line 7-7 of FIG. 6, and showing an example of a wing rib, upper and lower skin panels, and one of the bead stiffeners;

FIG. 8 is a sectional view of a further example of a bead stiffener having a bead width and a bead height that is different than the bead width and bead height of the bead stiffener of FIG. 7;

FIG. 18 is a flowchart of a method of loading a movable surface of an aircraft.

DETAILED DESCRIPTION

Figure 1:
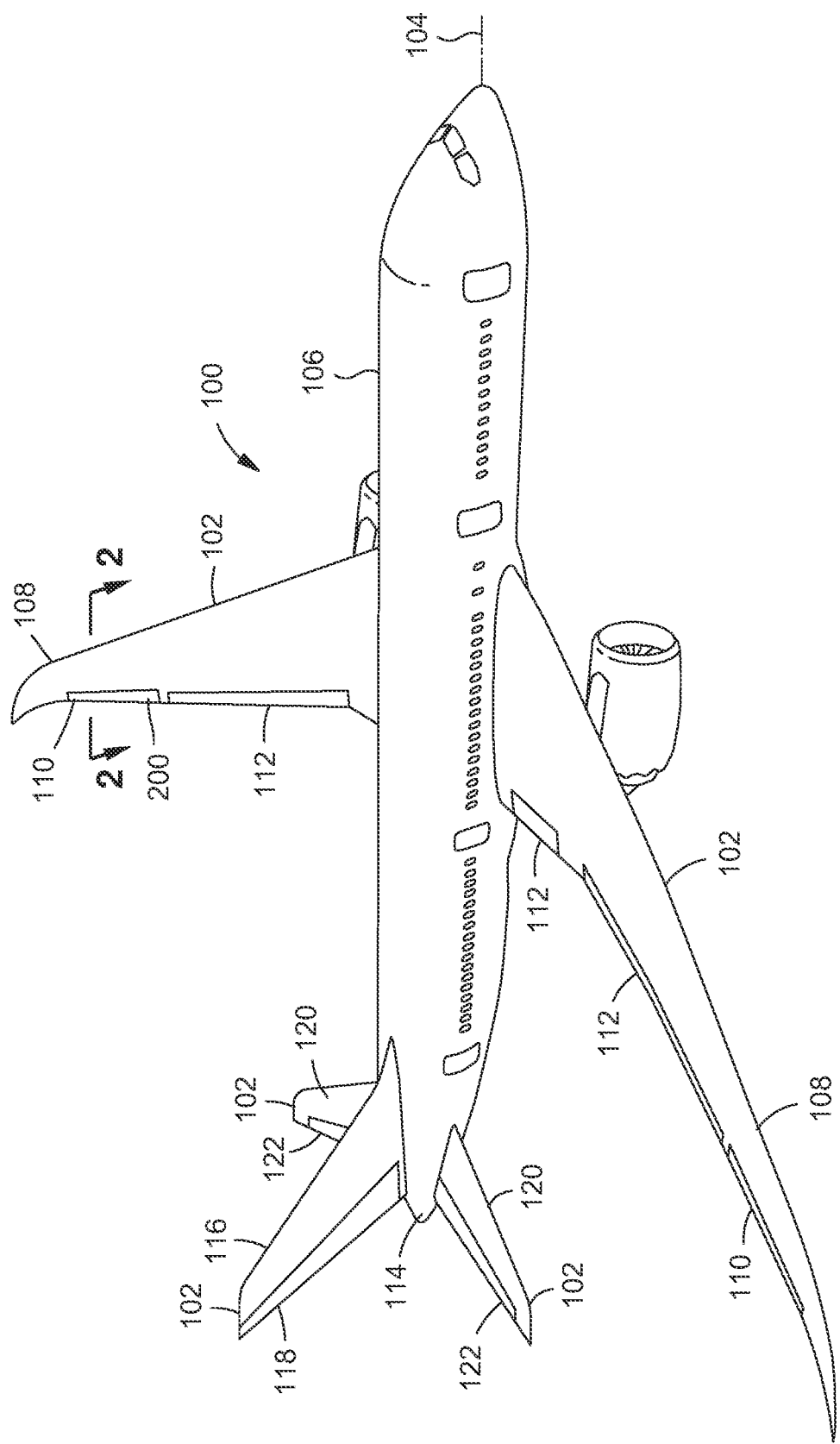
FIG. 1 is a perspective view of an example of an aircraft having one or more composite movable surfaces as presently-disclosed.

Referring now to the drawings which illustrate various examples of the disclosure, shown in FIG. 1 is a perspective view of an example of an aircraft 100 having one or more composite flight control surfaces, referred to herein as movable surfaces 200. The aircraft 100 includes a fuselage 106, a pair of wings 108 extending outwardly from the fuselage 106, and an empennage 114 at the aft end of the fuselage 106. In the present disclosure, the wings 108 may be referred to as aerodynamic members 102, and may include one or more movable surfaces 200 including, but not limited to, ailerons 110, flaps 112, and other movable surfaces 200. The empennage 114 includes a vertical tail comprising a vertical stabilizer 116 (i.e., the aerodynamic member 102) and a movable surface 200 configured as a rudder 118 pivotably coupled to the vertical stabilizer 116. The empennage 114 may additionally include a horizontal tail comprising horizontal stabilizers 120 each having an elevator 122 pivotably coupled to the horizontal stabilizer 120. In the present disclosure, horizontal stabilizers 120 may be referred to as aerodynamic members 102. Although described in the context of an aileron 110, the presently-disclosed movable surface 200 may be provided in any one of a variety of alternative configurations, and is not limited to an aileron 110, a rudder 118, or an elevator 122.

Advantageously, the movable surface 200 (see FIG. 2) is configured in an arrangement that results in a low-cost, high-strength, light-weight structure with high fatigue-loading performance. The movable surface 200 includes upper and lower skin panels 250, 252 each having a plurality of discrete bead stiffeners 300 for stiffening the skin panels 250, 252 in a cost-effective and structurally efficient manner. In addition, the movable surface 200 has a relatively small part count and a common material system (e.g., composite material) which allows the movable surface 200 to be manufactured at high production rates and at low cost. As described below, the movable surface 200 may be configured in an arrangement that avoids the above-mentioned repairability challenges associated with conventional movable surfaces 200 having a honeycomb-sandwich construction or a multi-rib construction.

Referring to FIGS. 2-5, shown is an example of the movable surface 200 configured as an aileron 110, and having a front spar 202, a plurality of ribs 230, and an upper skin panel 250 and a lower skin panel 252. In the example shown, the front spar 202 may be formed of composite material and may have a channel-shaped cross section. However, in other examples not shown, the front spar 202 may have a cross-sectional shape other than a channel-shaped cross-section. The front spar 202 extends along a spanwise direction between opposing movable surface ends 240.

Figure 2:
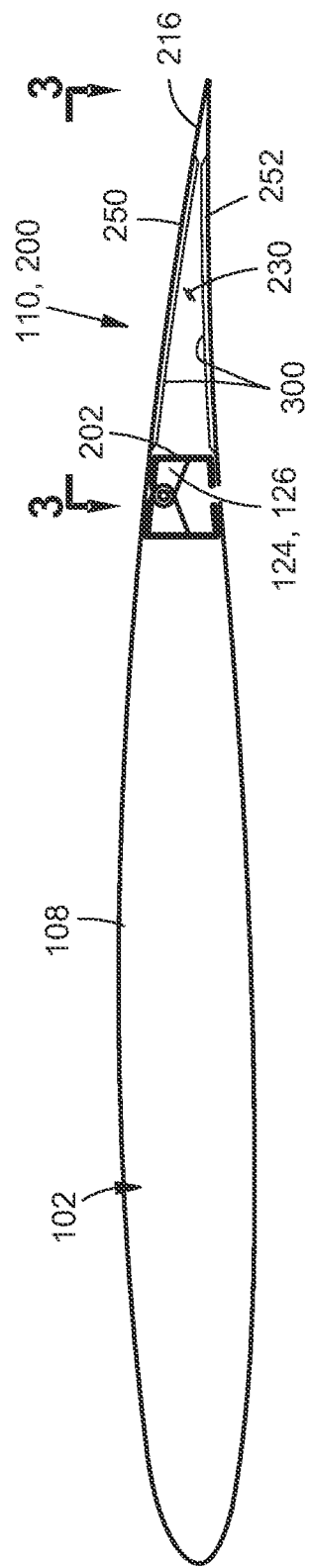
FIG. 2 is a sectional view of an example of a wing of the aircraft taken along line 2-2 of FIG. 1 and showing an example of the movable surface in the form of an aileron pivotably coupled to the wing.

Referring to FIG. 2, the movable surface 200 may include a plurality of attach fittings 124 mounted to the front spar 202 for coupling the movable surface 200 (e.g., an aileron 110) to an aerodynamic member 102 (e.g., a wing 108). In the example shown, the attach fittings 124 are configured as hinge fittings 126 for allowing the aileron 110 to be pivotably deflected upwardly and downwardly. A rudder 118 (FIG. 1) may also include hinge fittings 126 for pivotably coupling the rudder 118 to a vertical stabilizer 116 (FIG. 1). Likewise, an elevator 122 (FIG. 1) may include hinge fittings 126 for pivotably coupling the elevator 122 to a horizontal stabilizer 120 (FIG. 1). However, a movable surface 200 may include attach fittings 124 having a non-pivoting configuration. For example, in the case where the movable surface 200 is a flap 112, the attach fittings 124 may be configured as flap tracks (not shown) coupling the flap 112 to a wing aft portion. Such flap tracks may be configured to translate the flap 112 aftwardly while simultaneously pivoting the trailing edge of the flap 112 downwardly as the flap 112 is moved from a retracted position to an extended position.

Referring to FIGS. 4-7, the movable surface 200 includes a plurality of ribs 230 located at spaced intervals between the movable surface ends 240 and defining a plurality of bays 242 between adjacent pairs of the ribs 230. Each rib 230 may be formed of composite material, and extends between the front spar 202 and a trailing edge portion 216 of the movable surface 200. Each of the ribs 230 may be oriented generally parallel to a chordwise direction or streamwise direction of the movable surface 200, and which may be generally parallel to a longitudinal axis 104 (FIG. 1) of the aircraft 100 (FIG. 1). A pair of the ribs 230 may be configured as closeout ribs 232 located respectively at the opposing movable surface ends 240. The ribs 230 may also be configured as intermediate ribs 234 located at spaced intervals between the closeout ribs 232. In the example shown, the ribs 230 are spaced at non-uniform intervals between the closeout ribs 232. In an example not shown, the intermediate ribs 234 may be spaced at uniform intervals between the closeout ribs 232. The spanwise location of each of the ribs 230 may be based at least in part on the distribution of load on the movable surface 200. The intermediate ribs 234 may be located at the same spanwise location as the attach fittings 124 that couple the movable surface 200 (e.g., aileron) to the aerodynamic member 102 (e.g., wing).

As mentioned above, the movable surface 200 includes an upper skin panel 250 and a lower skin panel 252 each comprised of composite material. The upper skin panel 250 and lower skin panel 252 may each extend in a spanwise direction between the movable surface ends 240, and in a chordwise direction between the front spar 202 and the trailing edge portion 216. In this regard, the aft portion of the upper and lower skin panels 250, 252 may define the trailing edge portion 216 of the movable surface 200. The upper skin panel 250 and the lower skin panel 252 may be coupled to the ribs 230 and the front spar 202 via bonding and/or mechanical fasteners 450.

Figure 3:
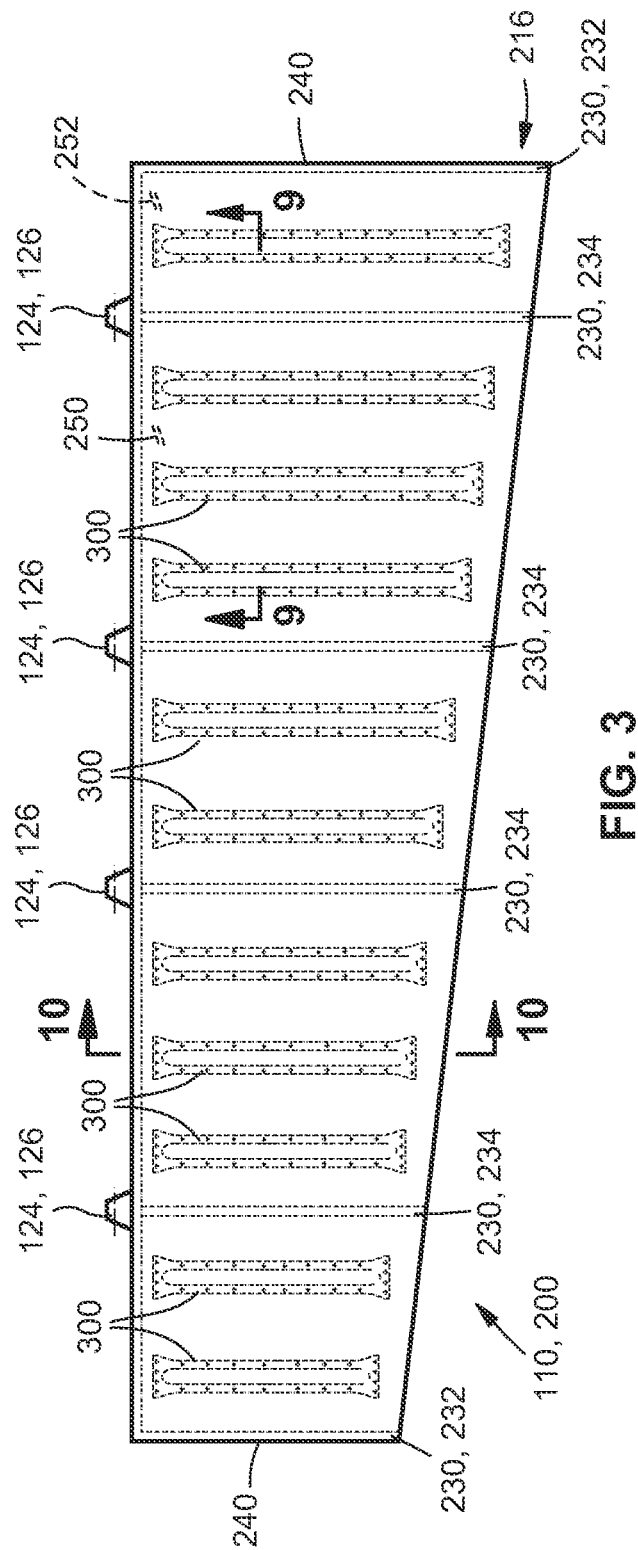
FIG. 3 is a top-down view of the aileron of FIG. 2.

Referring still to FIGS. 4-7, the movable surface 200 includes a plurality of bead stiffeners 300 coupled to the inner surface of the upper skin panel 250, and a plurality of bead stiffeners 300 coupled to the lower skin panel 252. As mentioned above, the bead stiffeners 300 increase the chordwise bending stiffness of the skin panels 250, 252, and thereby assist the skin panels 250, 252 in resisting pressure loads due to aerodynamic pressure on the movable surface 200. Each of the bead stiffeners 300 is comprised of composite material and may be bonded and/or mechanically fastened to the skin panels 250, 252. Within each bay 242 (FIG. 4), the upper skin panel 250 and/or the lower skin panel 252 has at least one bead stiffener 300 mounted to the upper skin panel 250 or lower skin panel 252. More preferably, the portion of each skin panel within each bay 242 has two or more bead stiffeners 300. In the example of FIG. 3, each bay 242 has from 1 to 3 bead stiffeners 300 coupled to the upper skin panel 250 and/or to the lower skin panel 252. However, a skin panel 250, 252 may include any number of bead stiffeners 300 within a bay 242 of the movable surface 200.

As mentioned above, the components of the movable surface 200 are formed of composite material. The composite material used in manufacturing the movable surface 200 may be in the form of composite plies 400 (see, e.g., FIGS. 7-8) of fiber-reinforced polymer matrix material (e.g., carbon fibers pre-impregnated with epoxy resin material). The composite plies 400 (i.e., prepreg) may be laid up in a stacked formation and cured to form a composite laminate in the form of the front spar 202 (FIG. 7), the optional trailing edge spacer 218 (FIG. 14), the optional rear spar 204 (FIGS. 15-16) and trailing edge wedge 220 (FIGS. 15-16), the upper skin panel 250 (FIG. 7) and lower skin panel 252 (FIG. 7), and the bead stiffeners 300 (FIG. 7). Each composite ply may have a thickness of 0.005 inch or more. The polymer matrix material of the composite plies 400 may be a thermosetting resin or a thermoplastic resin. The fibers of the composite plies 400 may be carbon fibers or the fibers may be formed of alternative materials such as glass, boron, aramid, ceramic or other non-metallic materials or metallic materials. Advantageously, movable surfaces 200 formed of composite material have improved corrosion resistance and improved fatigue strength relative to the corrosion resistance and fatigue strength of movable surfaces formed of metallic materials (e.g., aluminum).

The composite plies 400 (FIG. 7) of a component of the movable surface 200 (FIG. 7) may be unidirectional plies 404 (FIG. 7) and/or fabric plies 402 (FIG. 7). For example, the upper skin panel 250 (FIG. 7) and/or the lower skin panel 252 (FIG. 7), and the trailing edge spacer 218 (FIG. 14) may be comprised primarily of unidirectional plies 404. Each unidirectional ply may contain a plurality of generally parallel fibers oriented in a single direction. The unidirectional plies 404 of a skin panel 250, 252 may include 0-degree plies 406 (FIG. 7), +45-degree plies, −45-degree plies, and 90-degree plies, and/or other fiber orientations. Other components of the movable surface 200 may be comprised primarily of fabric plies 402. For example, the front spar 202 (FIG. 11), the ribs 230 (FIG. 11), the rear spar 204 (FIGS. 15-16), and/or the trailing edge wedge 220 (FIGS. 15-16) may be comprised primarily of fabric plies 402. In the present disclosure, a fabric ply 402 may be described as having multi-directional fibers. For example, a fabric ply 402 may include a woven arrangement of bi-directional fibers wherein the fibers are oriented perpendicular to each other.

The bead stiffeners 300 (FIG. 4) may be oriented generally parallel (e.g., ±20 degrees) to each other, and are non-parallel to the front spar 202 (FIG. 4). In one example, the bead stiffeners 300 may be oriented parallel or generally parallel to the ribs 230 (FIG. 4). The bead stiffeners 300 within one or more of the bays 242 may be spaced apart at a spanwise spacing 316 (FIG. 5) of 6-11 inches. In other examples, the bead stiffeners 300 may be spaced apart at a spanwise spacing 316 of 7.5-9.5 inches. The spanwise spacing 316 between the bead stiffeners 300 may be dictated by the stiffness requirements of the skin panel, which may be dictated by the predicted maximum aerodynamic pressure loads on the skin panel during flight, as described in greater detail below.

Referring to FIGS. 7-8 bead stiffener 300 has opposing bead stiffener flanges 302 interconnected by a bead stiffener cap 304. In this regard, each bead stiffener flange 302 may be connected to the bead stiffener cap 304 by a radius portion 212. The bead stiffener flanges 302 extend lengthwise along the sides of the bead stiffener 300. The bead stiffener flanges 302 may additionally extend across each of the opposing ends of the bead stiffener 300, as shown in FIGS. 5-6.

Figure 6:
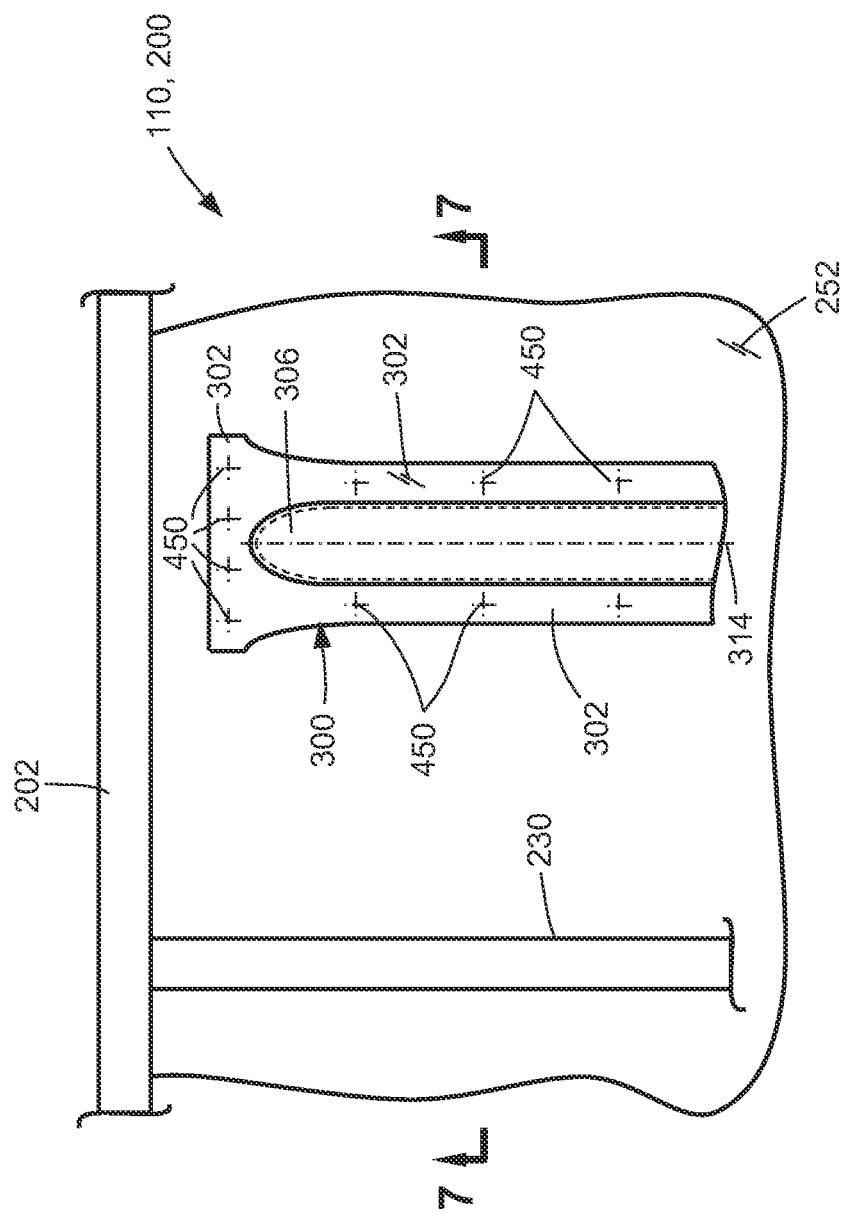
FIG. 6 is a top-down view of the portion of the aileron identified by reference numeral 6 of FIG. 5, and showing a portion of a bead stiffener and a rib coupled to the lower skin panel and the front spar of the aileron.

As shown in FIGS. 5-6, each bead stiffener 300 has a cap end 306 at each end of the bead stiffener 300. The cap ends 306 may be closed to improve the torsional stiffness of the bead stiffener 300 relative to the torsional stiffness of the bead stiffener 300 if the cap ends 306 were open. A drain hole 308 may be included in one or both of the cap ends 306 to allow moisture and/or contaminates to be flushed out of the bead stiffener cavity 310. Each bead stiffener 300 may be mounted to a skin panel 250, 252 such that the cap ends 306 are respectively located proximate the front spar 202 and the trailing edge portion 216. For example, the cap end 306 at one end of a bead stiffener 300 may be located within 1 inch of the front spar 202, and the cap end 306 at an opposite end of the bead stiffener 300 may be located within 2 inches of the aftermost edge of the trailing edge portion 216.

The bead stiffener flanges 302 may be bonded to a skin panel and/or coupled to the skin panel via mechanical fasteners 450. As shown in FIGS. 5-6, bead stiffener flanges 302 may be locally flared or widened at each end of the bead stiffener 300 to provide additional surface area over which peel stress in the bondline (e.g., adhesive layer) may be distributed into the skin panel 250, 252. In this regard, the flaring of the bead stiffener flanges 302 at the ends may reduce the peel stress in the bondline, and may thereby minimize or prevent the occurrence of cracking in the bondline (e.g., adhesive layer), and which may otherwise propagate along the length of the bead stiffener 300, potentially resulting in the separation of the bead stiffener 300 from the skin panel and/or loss of the stiffness contribution of the bead stiffener 300 to the skin panel 250, 252.

Referring to FIG. 7, the bead stiffener cap 304 may have a rounded cross-sectional shape. For example, FIG. 7 shows an example of a bead stiffener 300 having a semi-elliptical cross-sectional shape. However, in other examples, the bead stiffeners 300 may have a semi-circular cross-sectional shape or a semi-oval cross-sectional shape. The bead stiffener cap 304 may have a bead width 318 and a bead height 320. In some bead stiffener 300 examples, the ratio of the bead width 318 to bead height 320 may be no less than 2. The bending load capability (i.e., the bead stiffness) of the bead stiffener 300 in the chordwise direction may be a function of the bead width 318, the bead height 320, and/or the radius of curvature of the bead stiffener cap 304.

The bead stiffener cap 304 may be generally hollow and may define a bead stiffener cavity 310. The bead stiffener cap 304 of each bead stiffener 300 may have a cross section that is constant along a lengthwise direction of the bead stiffener 300, and which may simplify manufacturing of the bead stiffeners 300. In some examples, each bead stiffener 300 of the movable surface 200 may have the same cross-sectional shape, same cross-sectional size, and/or same thickness. Even further, each bead stiffener 300 may have the same quantity of composite plies 400 arranged in the same ply stacking sequence. However, to accommodate movable surfaces 200 that have a tapering width, the bead stiffeners 300 may be provided in different lengths complementary to the different widths of the movable surface 200 at different spanwise locations.

Referring to FIG. 8, in some examples, the bead stiffener cavity 310 may contain a foam member 312 which may fill the bead stiffener cavity 310. The foam member 312 may be contoured complementary to a final shape of the bead stiffener, and may thereby function as a tool or mandrel over which the bead stiffener 300 may be laid up and cured. In some examples, the foam member 312 may be retained within the bead stiffener cavity 310 after the bead stiffener 300 has been cured and attached (e.g., bonded and/or mechanically fastened) to the skin panel. By occupying the bead stiffener cavity 310, the foam member 312 may increase the bead ending stiffness of the bead stiffener 300. The foam material of the foam member 312 may be a lightweight, closed cell foam. The foam material may have a density in the range of 3-15 pounds per cubic feet.

As mentioned above, the bead stiffeners 300 may be laid up using a quantity of fabric plies 402 that provide the desired level of bead bending stiffness. In one example, each bead stiffener 300 may include from 4-6 fabric plies 402, and may be devoid of unidirectional plies 404. The use of fabric plies 402 may improve the formability of the highly curved surfaces that define the bead stiffener 300, and may avoid warpage and/or wrinkling associated with unidirectional plies 404 used in curved components. The bead stiffeners 300 may be configured to be compatible with the skin panels 250, 252 with regard to bending stiffness and axial stiffness. The bead stiffeners 300 and skin panels 250, 252 may be manufactured and assembled using one of several different manufacturing methods. In one example, the bead stiffeners 300 may be separately laid up and co-bonded with a cured skin panel 250, 252. In another example, the bead stiffeners 300 and a skin panel 250, 252 may be laid up and co-cured in one cure cycle. In still another example, the bead stiffeners 300 may be separately laid up and cured, and then secondary bonded to a cured skin panel 250, 252 via an adhesive layer. In any one of the above described examples, the bead stiffener flanges 302 may be mechanically fastened to a skin panel 250, 252 in addition to bonding of the bead stiffener 300 to the skin panel 250, 252.

Referring briefly again to FIG. 7, shown is an example of a rib 230 of the movable surface 200. The rib 230 has a channel-shaped cross section having a rib web 238 interconnecting an opposing pair of rib flanges 236. In the example shown, the rib flanges 236 are oriented approximately perpendicular to the rib web 238. Each rib flange 236 may be connected to the rib web 238 by a radius portion 212. As mentioned above, a rib 230 may be comprised of fabric plies 402 to avoid warpage of the rib 230 during curing, such as spring-in of the rib flanges 236 toward the rib web 238 which may occur during cool-down of the rib 230 from curing. In the example shown, each rib flange 236 may include one or more 0-degree plies 406 located approximately a mid-plane of the rib flange 236. The 0-degree plies 406 are excluded from the radius portion 212 and excluded from the rib web 238. Advantageously, 0-degree plies 406 in the rib flanges 236 may increase the shear strength of the rib flanges 236 in the connection with the upper and lower skin panels 250, 252.

Figure 9:
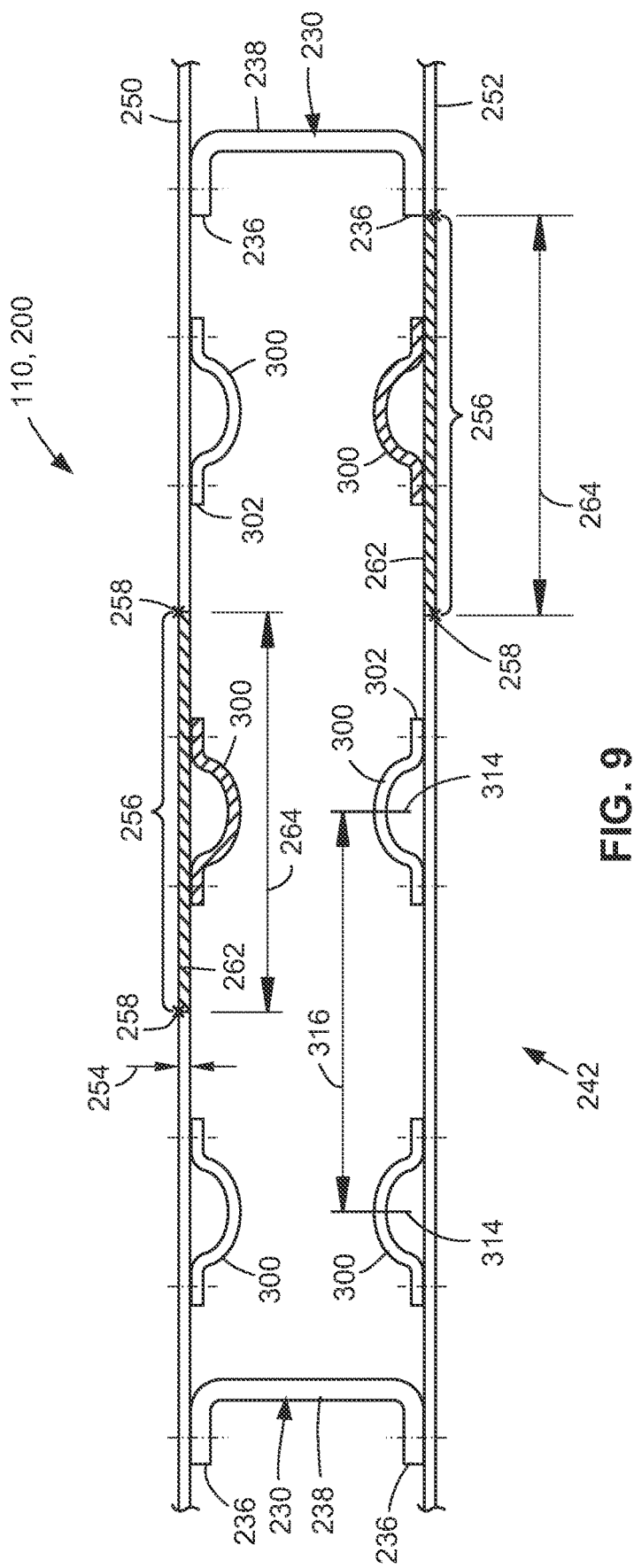
FIG. 9 is a spanwise sectional view of the aileron taken along line 9-9 of FIG. 3, and showing three bead stiffeners coupled to each of the upper and lower skin panels within one bay of the aileron, and further showing on each of the upper and lower skin panels an example of a bead-skin portion cross-sectional area corresponding to a combined skin-bead bending stiffness of a skin panel portion and associated bead stiffener.

Referring to FIGS. 7 and 9, the upper skin panel 250 and the lower skin panel 252 may have a panel thickness 254 that is constant along the chordwise direction between the front spar 202 (FIG. 4) and the trailing edge portion 216 (FIG. 4), and also constant along the spanwise direction between the opposing movable surface ends 240 (FIG. 4) of the movable surface 200. The constant panel thickness 254 may be achieved by eliminating ply drops (not shown) in the composite plies 400 that make up the skin panels 250, 252. By eliminating ply drops, manufacturing may be simplified, which may reduce cost and increase the production rate.

Advantageously, the panel thickness 254 of the upper skin panel 250 and lower skin panel 252 may be relatively thin compared to thicker skin panels used in conventional movable surfaces. The relatively thin gauge of the skin panels 250, 252 in the present disclosure results in improved fatigue loading performance (i.e., durability) relative to the reduced fatigue loading performance associated with thicker, heavier skin panels. The relatively thin gauge of the skin panels 250, 252 in the present disclosure is a result of the use of bead stiffeners 300 for stiffening the skin panels 250, 252, and also due to the skin panels 250, 252 (i.e., with bead stiffeners 300) being designed to buckle at or above limit load. Limit load may be described as the maximum load expected on the movable surface 200 during service. Designing the skin panels 250, 252 of the movable surface 200 to buckle at or above limit load is in contrast to the conventional practice of designing skin panels to buckle at or above the higher ultimate load (e.g., limit load multiplied by a safety factor), and which necessitates the use of thicker skin panels in conventional movable surfaces, which increases panel weight and results in higher dynamic loads with reduced fatigue loading performance.

Although the panel thickness 254 of the upper and lower skin panels 250, 252 may be constant, the upper and/or lower skin panel 252 may optionally include localized padup regions (not shown) at the locations where the skin panels 250, 252 are coupled to the front spar 202. A padup region may be described as a local increase in the quantity of composite plies 400 on the inner surface of the skin panel 250, 252. The skin panels 250, 252 may include a padup region at the spanwise location of each attach fitting 124 (e.g., hinge fitting 126). The increased thickness of the skin panel 250, 252 at the padup regions may facilitate the transfer of loads from the skin panels 250, 252 into the front spar 202 and into the attach fittings 124 (FIG. 3) coupling the movable surface 200 (e.g., aileron) to the aerodynamic member 102 (e.g., wing).

Referring to FIG. 9, shown is an example of one bay 242 of the aileron 110 of FIG. 3, and illustrating a plurality of bead stiffeners 300 coupled to each of the upper skin panel 250 and the lower skin panel 252 within the bay 242. The bead stiffeners 300 of the movable surface 200 may be configured to flex with the skin panels 250, 252 during chordwise bending of the skin panels 250, 252. Chordwise bending may occur due to out-of-plane loading of the skin panels 250, 252 in response to aerodynamic pressure on the skin panels 250, 252, such as when the movable surface 200 is deflected into the airstream during flight. Configuring the bead stiffeners 300 to flex with the skin panels 250, 252 may avoid high peel stress in the bondline between the bead stiffener flanges 302 and the inner surface of the skin panels 250, 252, and which may otherwise result in crack initiation within the bondline and/or separation of the bead stiffeners 300 from the skin panels 250, 252. Toward this end, the bead stiffeners 300 may be specifically configured to have a bead bending stiffness in the chordwise direction that is lower than the combined skin-bead bending stiffness of the skin panels 250, 252 and bead stiffeners 300 in the chordwise direction.

For example, the movable surface 200 may be configured such that each bead stiffener 300 has a bead bending stiffness that is approximately 40-60 percent (more preferably, 45-55 percent) of the combined skin-bead bending stiffness of the bead stiffener 300 and a skin panel portion 256 (i.e., of the upper skin panel 250 or the lower skin panel 252) supported by the bead stiffener 300 (e.g., FIG. 9). As mentioned above, the bead bending stiffness and the skin bending stiffness are in the chordwise direction. The bead bending stiffness may be measured at the midpoint 258 along the length of the bead stiffener 300. The skin bending stiffness is the stiffness of the skin panel portion 256 located directly underneath and attached to or supported by the bead stiffener 300, and may be measured at the same chordwise location as where the bending stiffness of the bead stiffener 300 is measured. Maintaining a 40-60 percent bending stiffness ratio of bead bending stiffness to combined skin-bead bending stiffness may limit the magnitude of peel stress in the bead-skin bondline, while also allowing the bead stiffeners 300 to provide bending stiffness that prevents buckling of the skin panels 250, 252 (i.e., stiffened by the bead stiffeners 300) when the movable surface 200 is at or below limit load.

As mentioned above, the use of the bead stiffeners 300 allows the skin panels 250, 252 to have a relatively thin gage or panel thickness 254. The stiffness of the bead stiffeners 300 may limit out-of-plane deflection of the skin panels 250, 252 to a relatively small value (e.g., less than 0.0005 inch) from the as-designed contour of the outer mold line of the skin panels 250, 252. Limiting out-of-plane deflection of the skin panels 250, 252 may result in natural laminar flow of the airstream over the movable surface 200, which may improve aerodynamic efficiency by reducing or preventing separation of airflow from the outer mold line of the movable surface 200, thereby reducing aerodynamic drag otherwise created by separated turbulent flow.

As mentioned above, each bead stiffener 300 may have a bead bending stiffness that is approximately 40-60 percent of the combined skin-bead bending stiffness of the bead stiffener 300 and a skin panel portion 256 supported by the bead stiffener 300. The cross-sectional area of one of the bead stiffeners 300 and associated skin panel portion 256 are represented by the crosshatched area in FIG. 9, and identified as the bead-skin portion cross-sectional area 262. For bead stiffeners 300 that are located between an adjacent pair of bead stiffeners 300, the skin panel portion 256 has a panel portion width 264 that extends between midpoints 258 respectively located on opposite sides of the bead stiffener 300. Each midpoint 258 is located midway between the edge of the bead stiffener flange 302 of the bead stiffener 300, and the edge of the bead stiffener flange 302 of an immediately adjacent bead stiffener 300, as shown in the upper skin panel 250 of FIG. 9. For bead stiffeners 300 that are located between a rib 230 and another bead stiffener 300, the panel portion width 264 extends between the rib flange 236 edge or rib web 238 of the rib 230 on one side of the bead stiffener 300 and, on an opposite side of the bead stiffener 300, the midpoint 258 between the edge of the bead stiffener flange 302 of the bead stiffener 300, and an immediately adjacent bead stiffener 300, as shown in the lower skin panel 252 of FIG. 9. In each example, the panel portion width 264 of the skin panel portion 256 is centered on the bead stiffener 300.

The magnitude of the chordwise skin bending stiffness of a skin panel portion 256 may be dictated at least in part by the ply composition, ply quantity, and ply stacking sequence of the composite plies 400 that make up the skin panel 250, 252, and by the panel portion cross-sectional area, which may be a function of the panel portion width 264 and the panel thickness 254. Similarly, the magnitude of the chordwise (i.e., lengthwise) bead bending stiffness of a bead stiffener 300 may be dictated at least in part by the ply composition, ply quantity, and ply stacking sequence of the composite plies 400 that make up the bead stiffener 300, and also by the size (e.g., bead width 318, bead height 320, etc.) and shape (e.g., radius of curvature of the bead stiffener cap 304) of the bead stiffener cross-sectional area.

In addition to a preferred 40-60 percent bending stiffness ratio of bead bending stiffness to combined skin-bead bending stiffness, the bead stiffeners 300 may also have a 40-60 percent (more preferably, 45-55 percent) axial stiffness ratio of bead axial stiffness to combined bead-skin portion axial stiffness. Bead axial stiffness is the stiffness along the lengthwise direction of the bead stiffener 300. The combined bead-skin axial stiffness is the bead axial stiffness combined with the in-plane stiffness of the skin panel portion 256 that is supported by the bead stiffener 300. The in-plane stiffness of the skin panel portion 256 is measured parallel to the lengthwise direction of the bead stiffener 300. Axial stiffness is a measure of the resistance of a structural member to in-plane deformation when subjected to an axial load. Axial loading of the bead stiffeners 300 and skin panels 250, 252 may occur in response to chordwise bending due to the above-described aerodynamic loading of the skin panels 250, 252. For example, during upward deflection of an aileron 110, the aerodynamic pressure on the upper surface of the aileron 110 induces chordwise bending of the aileron 110, which may result in axial (i.e., in-plane) tension in the upper skin panel 250 and associated bead stiffeners 300, and axial (i.e., in-plane) compression in the lower skin panel 252 and associated bead stiffeners 300.

Figure 10:
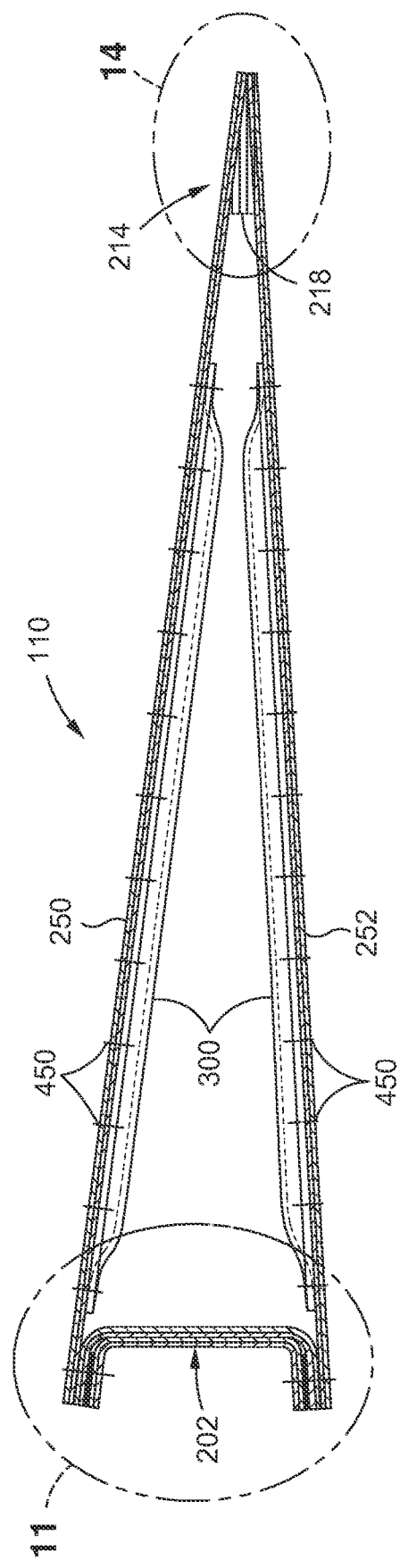
FIG. 10 is a chordwise sectional view of the aileron taken along line 10-10 of FIG. 3, and showing a bead stiffener coupled to each of the upper skin panel and lower skin panels, and further showing the upper and lower skin panels coupled to the front spar at a forward portion of the aileron, and showing the upper and lower skin panels coupled to each other at a trailing edge portion of the aileron.
Figure 11:
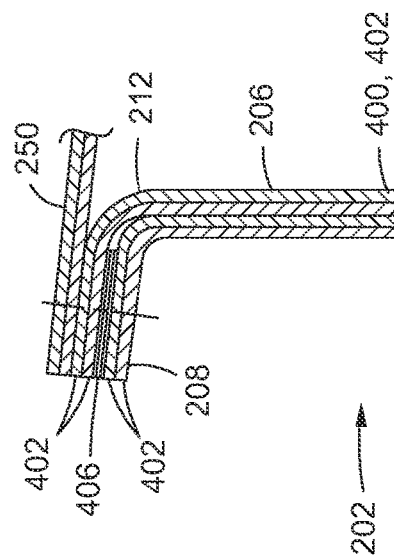
FIG. 11 is a magnified view of the portion of the aileron identified by reference numeral 11 of FIG. 10, and illustrating an example of a front spar having 0-degree plies interleaved within the fabric plies of the spar outer flanges.

Referring to FIGS. 10-11, shown in FIG. 10 is a chordwise sectional view of an example of an aileron 110. In the example shown, bead stiffeners 300 are coupled to the upper skin panel 250 and lower skin panel 252 via bonding and mechanical fasteners 450. Also shown is the coupling of the upper and lower skin panels 250, 252 to the front spar 202. At the trailing edge portion 216 of the aileron 110, the upper and lower skin panels 250, 252 may be joined together via a trailing edge spacer 218 installed between the upper and lower skin panels 250, 252, as described in greater detail below.

Referring to FIG. 11, shown is an example of the front spar 202 formed in a single-piece configuration having a channel-shaped cross section including a spar web 206 and an opposing pair of spar outer flanges 208. Each one of the spar outer flanges 208 is interconnected to the spar web 206 by a radius portion 212. The spar web 206, the radius portions 212, and the spar outer flanges 208 are comprised of fabric plies 402, with no unidirectional plies 404 in the spar web 206 or in the radius portions 212. The spar outer flanges 208 may include one or more 0-degree plies 406 interleaved within the fabric plies 402 of the spar outer flanges 208. The 0-degree plies 406 are excluded from the radius portion 212 and the spar web 206 to avoid warpage (e.g., spring-in) of the spar outer flange toward the spar web during curing. The 0-degree plies 406 may be located approximately mid-plane of the spar outer flange 208, and may increase the shear strength of the spar outer flanges 208 in the connection with the upper and lower skin panels 250, 252.

Figure 13:
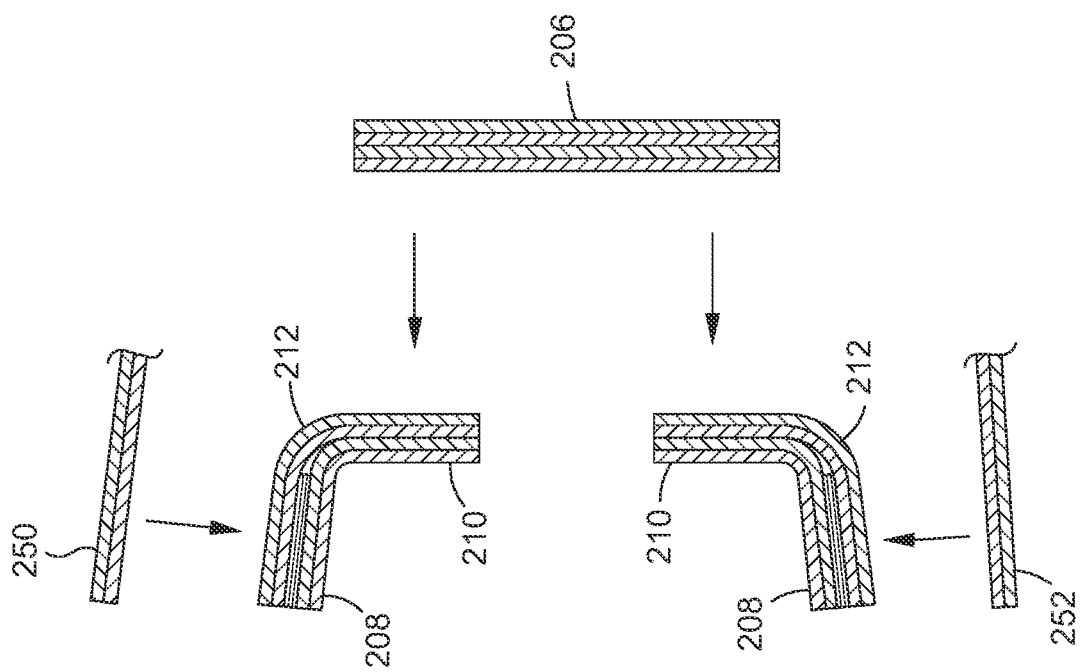
FIG. 13 is a disassembled view of the front spar of FIG. 12.
Figure 12:
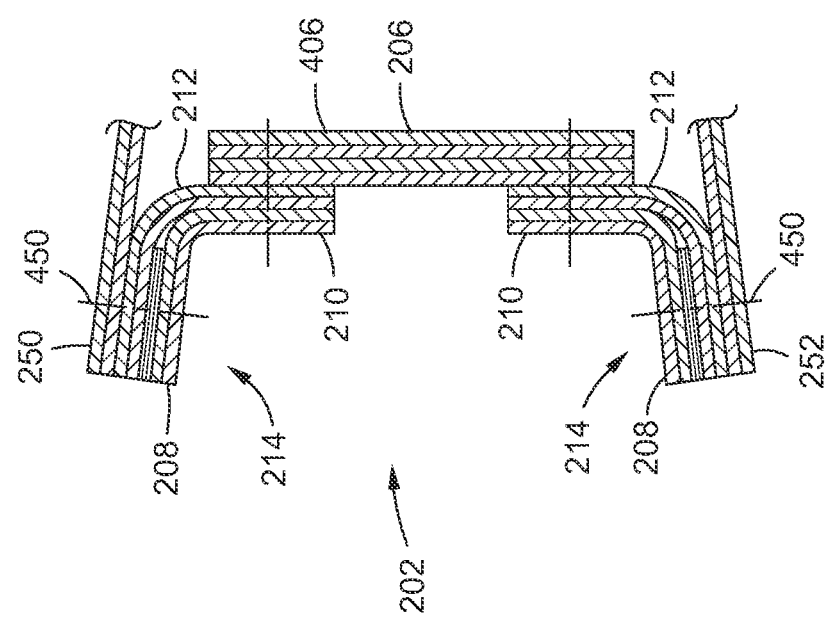
FIG. 12 is an assembled sectional view of an example of a hybrid configuration of the front spar having upper and lower spar chords interconnected by a spar web.

Referring to FIGS. 12-13, shown is an example of the front spar 202 in a multi-piece configuration. FIGS. 12 and 13 respectively show the multi-piece configuration of the front spar 202 in an assembled state (FIG. 12) and a disassembled state (FIG. 13). The front spar 202 has a pair of spar chords 214 (upper and lower) interconnected by a spar web 206. Each of the spar chords 214 may include a spar inner flange 210 and a spar outer flange 208 interconnected by a radius portion 212. The spar inner flange 210 of each spar chord 214 may be coupled to the spar web 206 via mechanical fastening, such as via a single or double row of mechanical fasteners 450 extended through the spar inner flange 210 and the spar web 206. The spar outer flange 208 of each spar chord 214 may be coupled to a skin panel (e.g., the upper skin panel 250 or the lower skin panel 252). The spar outer flanges 208 may be bonded (e.g., co-bonded) to one of the skin panels 250, 252, and may additionally be mechanically fastened via a single or double row of mechanical fasteners 450 that may be extended through the spar outer flange 208 and the skin panel. Each of the spar chords 214 is comprised of fabric plies 402. The spar web 206 may be comprised of unidirectional plies 404.

In some examples of the front spar 202, the spar outer flanges 208 of the spar chords 214 in FIGS. 12-13 may optionally include one or more 0-degree plies 406 for increasing the shear strength of the spar outer flanges 208, similar to the 0-degree plies 406 in the front spar 202 of FIGS. 10-11. The multi-piece configuration of the front spar 202 may simplify manufacturing of the movable surface 200 by allowing the spar outer flange 208 of each of the spar chords 214 to be bonded (e.g., co-bonded or secondary bonded) respectively to the upper and lower skin panels 250, 252, after which the upper and lower skin panels 250, 252 and spar chords 214 may be coupled to the plurality of ribs 230. The spar chords 214 (upper and lower) may be interconnected by fastening the spar web 206 to the spar inner flanges 210 of the spar chords 214. Although FIGS. 12-13 show the spar web 206 mounted to the back side of the front spar 202, in an example not shown, the spar web 206 on the opposite or front side of the front spar 202.

Figure 14:
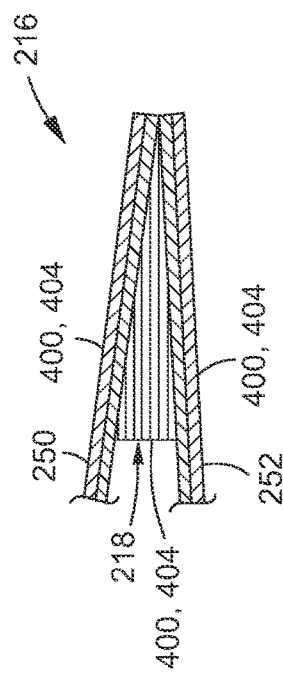
FIG. 14 is a magnified view of the portion of the aileron identified by reference numeral 14 of FIG. 10, and illustrating an example of a trailing edge spacer installed between the upper and lower skin panels at the trailing edge portion.

Referring to FIG. 14, shown is an example of an arrangement of the trailing edge portion 216 of the movable surface 200. In the example shown, the movable surface 200 includes the above-mentioned trailing edge spacer 218 positioned between the upper skin panel 250 and the lower skin panel 252. The trailing edge spacer 218 may extend in a spanwise direction between the closeout ribs 232. The trailing edge spacer 218 may be provided in a triangular shaped cross-sectional shape complementary to the angle between the inner surfaces of the upper and lower skin panels 250, 252 at the trailing edge portion 216. The trailing edge spacer 218 may be formed as a laminate of unidirectional plies 404 that, once cured, may be machined into the above-mentioned triangular shape. The upper and lower skin panels 250, 252 may be bonded and/or mechanically fastened to the trailing edge spacer 218. The trailing edge spacer 218 may provide a simple, low-cost means for interconnecting the upper and lower skin panels 250, 252 at the trailing edge portion 216.

Figure 15:
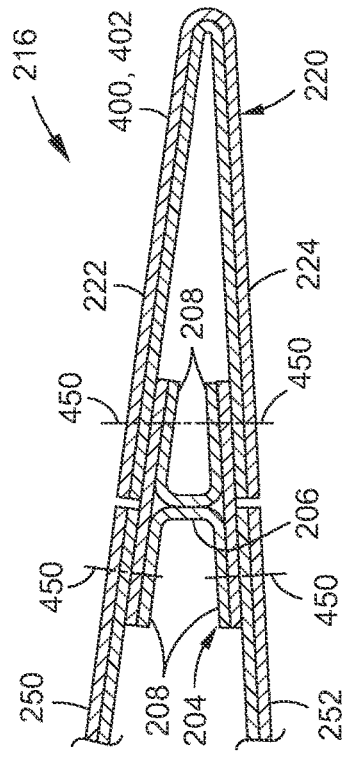
FIG. 15 is an assembled sectional view of a further example of the trailing edge portion having a rear spar to which the upper and lower skin panels are coupled, and further showing a trailing edge wedge configured to be removably attachable to the rear spar.
Figure 16:
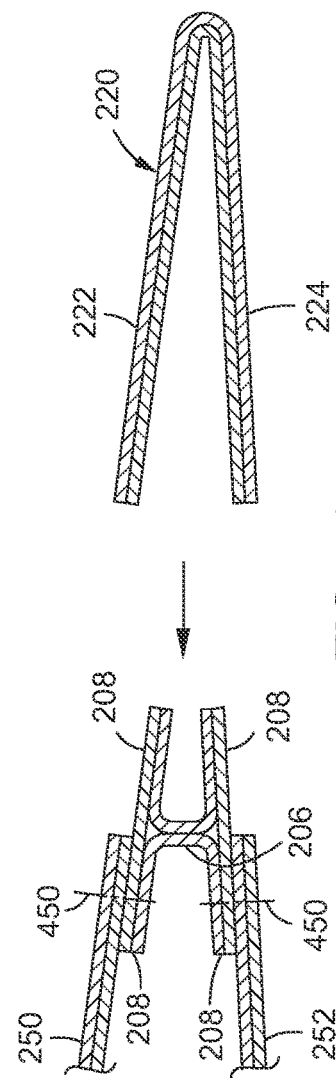
FIG. 16 is a disassembled view of the example of the trailing edge portion of FIG. 15.

Referring to FIGS. 15-16, shown is a further example of an arrangement of the trailing edge portion 216 having a rear spar 204 extending along a spanwise direction between the movable surface ends 240 (e.g., between the closeout ribs 232). The rear spar 204 may include a pair of spar outer flanges 208 on upper and lower sides of the rear spar 204. The spar outer flanges 208 may be spaced apart from each other and oriented respectively parallel to the upper skin panel 250 and lower skin panel 252. The spar outer flanges 208 may be interconnected by a spar web 206 which may be oriented non-parallel to the spar outer flanges 208, although the rear spar 204 may have a different cross-sectional shape than the shape shown in FIGS. 15-16. Although not shown in FIGS. 15-16, the ribs 230 of the movable surface 200 may be attached to the rear spar 204. In addition, the upper skin panel 250 and the lower skin panel 252 may each be coupled to the rear spar 204 such as by bonding and/or via mechanical fasteners 450 coupling the upper skin panel 250 and lower skin panel 252 to the spar outer flanges 208 respectively on the upper and lower sides of the rear spar 204.

Referring still to FIGS. 15-16, the movable surface 200 may include a trailing edge wedge 220 configured to be removably coupled to the rear spar 204. The trailing edge wedge 220 may extend along a spanwise direction and may have a length equal to the length of the rear spar 204. The trailing edge wedge 220 may be formed of composite material such as fabric plies 402, and may have a cross-sectional shape defined by a wedge upper flange 222 and a wedge lower flange 224 oriented at an acute angle relative to each other. The wedge upper flange 222 and the wedge lower flange 224 may be parallel respectively to the upper skin panel 250 and the lower skin panel 252. When the trailing edge wedge 220 is attached to the rear spar 204, the outer surface of the web upper flange and wedge lower flange 224 may be flush (e.g., no steps) with the outer surface respectively of the upper skin panel 250 and lower skin panel 252 to provide an aerodynamically smooth surface for airflow.

The wedge upper flange 222 and the wedge lower flange 224 may be attached to the spar outer flanges 208 respectively on the upper and lower sides of the rear spar 204. For example, the trailing edge wedge 220 may be coupled to the rear spar 204 by means of mechanical fasteners 450 (e.g., screws, bolts, other threaded fasteners) installed in fastener holes formed in the wedge upper and lower flanges 222, 224 and the spar outer flanges 208. Mechanical fasteners 450 may be threadably engaged to threaded receptacles (not shown) such as nut plates or threaded inserts permanently mounted to or installed in the rear spar 204. By configuring the trailing edge wedge 220 to be easily removable from the rear spar 204, any damage to the trailing edge portion 216 of the movable surface 200 may be addressed by simply removing and replacing the trailing edge wedge 220. In this regard, the trailing edge wedge 220 avoids one of the drawbacks associated with conventional movable surfaces, which require removal of the entire movable surface if the trailing edge is damaged, and replacement with a new movable surface.

Figure 17:
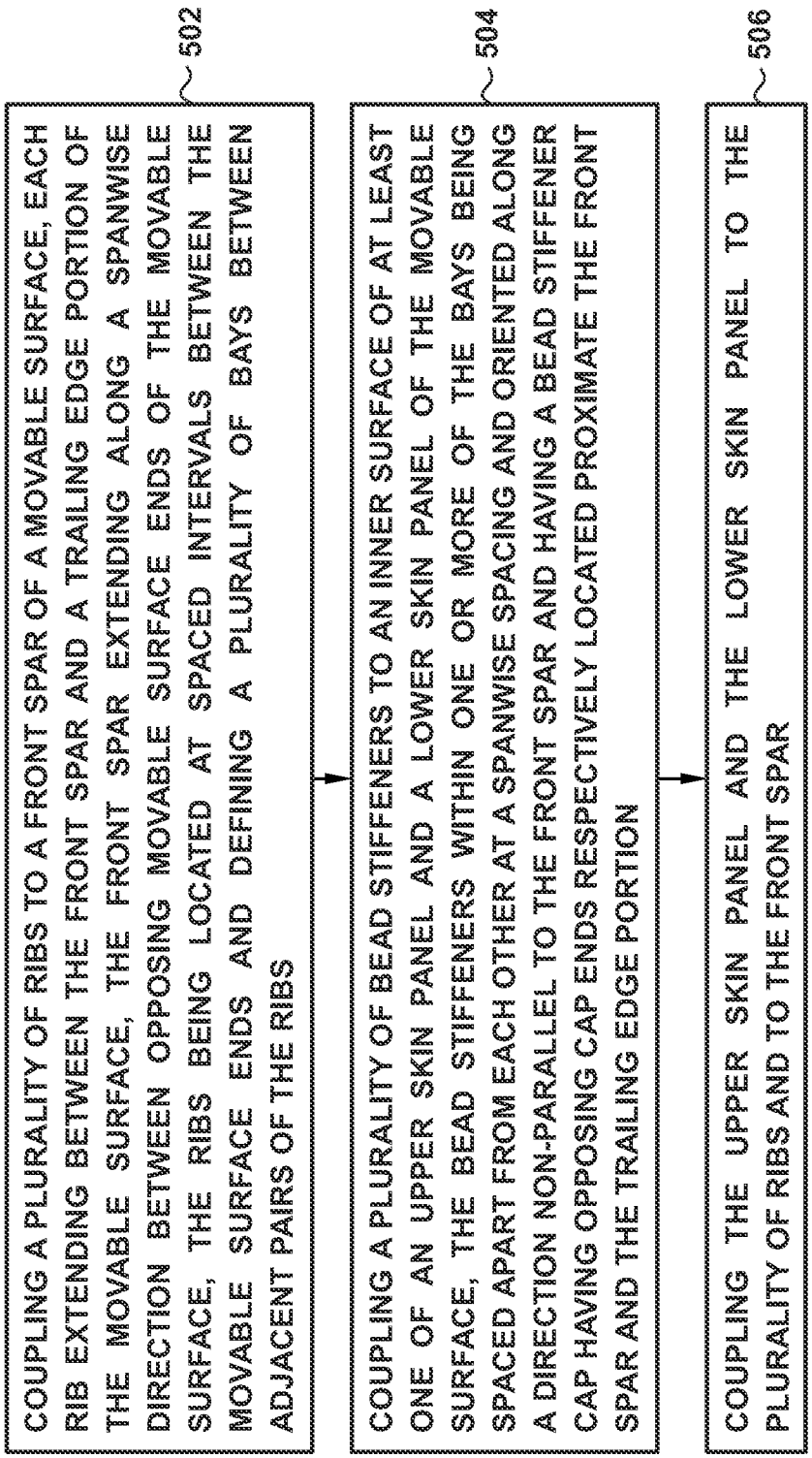
FIG. 17 is a flowchart of a method of manufacturing a movable surface of an aircraft.

Referring now to FIG. 17, shown is a method 500 of manufacturing a movable surface 200 (e.g., a flight control surface) of an aircraft 100. As mentioned above, in some examples, the movable surface 200 may be manufactured as an aileron 110 as shown in the figures. Alternatively, the movable surface 200 may be manufactured as an elevator 122, a rudder 118, a flap 112, or any one of a variety of other types of movable surfaces 200.

The method 500 may include manufacturing a front spar 202 by laying up a plurality of fabric plies 402 to result in the front spar 202 having a channel-shaped. The front spar 202 may have a single-piece configuration having a spar web 206 and an opposing pair of spar outer flanges 208 each interconnected to the spar web 206 by a radius portion 212. To improve the shear capability of the spar outer flanges 208, the method 500 may include interleaving one or more 0-degree plies 406 within the fabric plies 402 of the spar outer flanges 208. The one or more 0-degree plies 406 may be interleaved at an approximate mid-plane of each spar outer flange 208, and may be excluded from the radius portion 212.

In some examples, the front spar 202 may be manufactured in a multi-piece configuration, which may include laying up a spar web 206, and separately laying up pair of spar chord 214 each having a spar outer flange 208 and a spar inner flange 210 interconnected by a radius portion 212. The spar outer flange 208 may be oriented approximately 90 degrees (±30 degrees) to the spar inner flange 210. The method 500 may include bonding the spar outer flange 208 of the spar chords 214 respectively to the upper skin panel 250 or the lower skin panel 252 as mentioned above, after which the upper and lower skin panels 250, 252 may be coupled to the ribs 230 (described below), and the spar web 206 may be fastened to the spar inner flanges 210 to interconnect the spar chords 214.

The method 500 may also include mounting one or more attach fittings 124 to the front spar 202. The attach fittings 124 may be comprised of metallic material (e.g., aluminum or titanium) or composite material (e.g., graphite-epoxy), and may be mounted to the front spar 202 at locations that are aligned with the ribs 230. As mentioned above, the attach fittings 124 may couple the movable surface 200 (e.g., an aileron) to an aerodynamic member 102 (e.g., a wing).

The method 500 may additionally include laying up a plurality of fabric plies 402 to result in a plurality of ribs 230. The ribs 230 may each be laid up in a channel-shaped cross section having a rib web 238 and an opposing pair of rib flanges 236 in a single-piece configuration. Similar to the above-described front spar 202, each rib flange 236 may be interconnected to the rib web 238 by a radius portion 212. The method may further include interleaving one or more 0-degree plies 406 within the fabric plies 402 of the rib flanges 236 to improve the shear capability of the rib flanges 236. The 0-degree plies 406 may be interleaved at an approximate mid-plane of each rib flange 236. The 0-degree plies 406 may be excluded from the radius portion 212 and the rib web 238.

The method 500 includes step 502 of coupling the ribs 230 to the front spar 202 of the movable surface 200. As mentioned above, the front spar 202 extends along a spanwise direction between the opposing movable surface ends 240 of the movable surface 200. Each rib 230 extends between the front spar 202 and a trailing edge portion 216 of the movable surface 200. Each rib 230 may be oriented along a chordwise direction or a streamwise direction of the movable surface 200. The ribs 230 include a closeout rib 232 at each of the movable surface ends 240, and a plurality of intermediate ribs 234 located at spaced intervals between the closeout ribs 232. The ribs 230 may be located on the front spar 202 at spaced intervals between the movable surface ends 240. A plurality of bays 242 may be defined between adjacent pairs of the ribs 230.

The method 500 may additionally include laying up a plurality of fabric plies 402 to result in a plurality of bead stiffeners 300. Each bead stiffener 300 may be devoid of unidirectional plies 404, which may avoid undesirable warpage and/or wrinkling that may otherwise occur in the bead stiffeners 300. As described above, each bead stiffener 300 may be laid up such that the bead stiffener 300 has a bead stiffener cap 304 having a rounded cross-sectional shape, and such that the cap ends 306 are closed. The rounded cross-sectional shape may be a semi-circular cross-sectional shape, a semi-elliptical cross-sectional shape, a semi-oval cross-sectional shape, or other cross-sectional shape.

The laying up the bead stiffeners 300 may include laying up the bead stiffeners 300 have a bead stiffener cap 304 having a cross section that is constant along a lengthwise direction of the bead stiffener 300. In this regard, a shipset of bead stiffeners 300 for a movable surface 200 may be laid up to have a common configuration. For example, each bead stiffener 300 within a shipset may have the same cross-sectional size, same cross-sectional shape, same ply composition, same ply quantity, and same ply stacking sequence, which may significantly reduce the cost and time required for manufacturing a movable surface 200. For movable surfaces 200 having a tapering width such as the aileron 110 shown in the figures, the bead stiffeners 300 may be manufactured with different lengths corresponding to the width of the movable surface 200 at each of the mounting locations of the bead stiffeners 300.

The bead stiffeners 300 may be laid up to have a bead bending stiffness that is approximately 40-60 percent of the combined bead-skin portion bending stiffness of the bead stiffener 300 and the skin panel portion 256 (i.e., of the upper skin panel 250 or lower skin panel 252) supported by the bead stiffener 300, as described above. More preferably, the bead stiffeners 300 may be laid up to have a bead bending stiffness that is approximately 45-55 percent of the combined bead-skin portion bending stiffness. In addition to the above-mentioned bending stiffness ratio, the bead stiffeners 300 may also be laid up to have a 40-60 percent (more preferably, 45-55 percent) axial stiffness ratio of bead axial stiffness to combined bead-skin portion axial stiffness. As described above, configuring each bead stiffener 300 to have a bead stiffness (i.e., bending stiffness and/or axial stiffness) that is lower than the combined bead-skin portion stiffness (i.e., bending stiffness and/or axial stiffness) of the skin panel portion 256 and the bead stiffener 300 may avoid high peel stress in the bondline between the bead stiffener flanges 302 and the inner surface of the skin panels 250, 252, and which may otherwise result in separation of the bead stiffener 300 from the skin panel portion 256.

In some examples, the bead stiffeners 300 may be laid up over a foam member 312. As mentioned above, the foam member 312 may be comprised of closed-cell foam, although other materials may be used. The foam member 312 may be contoured complementary to a final shape of the bead stiffener 300, and may serve as a layup mandrel and/or a curing mandrel for the bead stiffener 300. Each bead stiffener 300 may be separately laid up over a foam member 312, and then co-cured with an upper or lower skin panel 250, 252 in a single cure cycle. In another example, each of the bead stiffeners 300 may be laid up over a foam member 312, and then co-bonded in the uncured state (e.g., green state) to a cured skin panel (e.g., upper or lower skin panel 250, 252). In a still further example, the bead stiffeners 300 in the cured state may be co-bonded to a skin panel 250, 252 in the uncured state. Even further, bead stiffeners 300 in the cured state may be secondary bonded to a skin panel 250, 252 in the cured state using an adhesive layer between the bead stiffener flanges 302 and the skin panel 250, 252.

The method 500 may optionally include removing the foam member 312 from each bead stiffener 300 after curing of the bead stiffener 300. However, in other examples, the foam member 312 may be retained within the bead stiffeners 300 after curing, and may remain within the bead stiffener cavity 310 during the life of the movable surface 200. In such an arrangement where the foam member 312 remains within the bead stiffener cavity 310, the foam member 312 may increase the bending stiffness of the bead stiffeners 300. Regardless of whether or not the foam member 312 is retained within the bead stiffener cavity 310, the bead stiffeners 300 may be coupled to the skin panels 250, 252 via bonding (e.g., co-curing, co-bonding, or secondary bonding) and/or via mechanical fastening of the bead stiffener flanges 302 to the skin panels 250, 252.

The method 500 may include laying up a plurality of unidirectional plies 404 to result in the upper skin panel 250 and/or the lower skin panel 252. As mentioned above, each skin panel 250, 252 may advantageously be laid up without ply drops (not shown), and which may result in the skin panels 250, 252 each having a panel thickness 254 that is constant in the chordwise direction, and constant in the spanwise direction, as described above. Fabric plies 402 may be omitted from the skin panels 250, 252 to avoid potential warpage and/or wrinkling of the skin panels 250, 252 during curing.

Step 504 of the method 500 includes coupling a plurality of bead stiffeners 300 to an inner surface of at least one of an upper skin panel 250 and a lower skin panel 252, as mentioned above. The method 500 may include locating one or more bead stiffeners 300 within one or more of the bays 242 of the movable surface 200. More preferably, two or more bead stiffeners 300 may be coupled to each of the upper and lower skin panels 250, 252 within each bay 242 of the movable surface 200. The bead stiffeners 300 may be oriented parallel or generally parallel to each other, and are non-parallel to the front spar 202. Each bead stiffeners 300 may be located such that the opposing cap ends 306 are located in close proximity to, but are non-contacting, respectively the front spar 202 and the trailing edge portion 216.

The step 504 of coupling the bead stiffeners 300 to the upper or lower skin panel 250, 252 may include spacing the bead stiffeners 300 apart from each other at a spanwise spacing 316 of from 6-11 inches between bead centerlines 314. More preferably, the spanwise spacing 316 may be between 7.5 to 9.5 inches. However, as indicated above, the spanwise spacing 316 may be dictated by the stiffness requirements of the skin panel, which may be dictated by the predicted maximum load (i.e., limit load) on the movable surface 200 during flight. For example, the bending stiffness of a structural member is a function of the second moment of inertia of the structural member, which is a function of cross-sectional area. As noted above, the cross-sectional area of a skin panel portion 256 may be a function of (i.e., the product of) the panel portion width 264 and the panel thickness 254.

Step 506 of the method 500 includes coupling the upper skin panel 250 and the lower skin panel 252 to the plurality of ribs 230 and to the front spar 202. For examples of the movable surface 200 having a trailing edge spacer 218, the method may include laying up the trailing edge spacer 218 in a triangular shape that is complementary to the orientations of the upper skin panel 250 and lower skin panel 252. The method may include laying unidirectional plies 404 to result in the trailing edge spacer 218, after which the trailing edge spacer 218 may be cured and machined into a triangular shape that is complementary to the angle defined between the upper and lower skin panel 250, 252. The upper skin panel 250 and lower skin panel 252 may be coupled to the trailing edge spacer 218 via bonding and/or mechanical fasteners 450.

As an alternative to a trailing edge spacer 218, the method 500 may include laying up a rear spar 204. The rear spar 204 may be laid up of fabric plies 402 similar to the above-described operation for laying up the front spar 202. The rear spar 204 may include spar outer flanges 208 on the upper and lower sides of the rear spar 204. The spar outer flanges 208 may be interconnected by a spar web 206. The method 500 may include coupling the upper skin panel 250 and the lower skin panel 252 to the forward portions of the spar outer flanges 208 of the rear spar 204. The method 500 may further include removably attaching a trailing edge wedge 220 to the rear spar 204. More specifically, the wedge upper flange 222 and wedge lower flange 224 of the trailing edge wedge 220 may be respectively coupled to the spar outer flanges 208 on the upper and lower sides of the rear spar 204. The trailing edge wedge 220 may be coupled to the rear spar 204 via mechanical fasteners 450. The fasteners 450 may include threaded fasteners or non-threaded fasteners. Examples of threaded fasteners include screws, bolts, or other types of threaded fasteners allowing for field removal and/or replacement of the trailing edge wedge 220.

Referring now to FIG. 18, shown is a flowchart of a method 600 of loading (i.e., applying a load to) a movable surface 200 of an aircraft 100. The method includes step 602 of providing the movable surface 200 which, as described above, includes a front spar 202 extending between opposing movable surface ends 240. In addition, the movable surface 200 includes a plurality of ribs 230 located at spaced intervals between the movable surface ends 240 and which define a plurality of bays 242 between adjacent pairs of the ribs 230. Each rib 230 extends between the front spar 202 and a trailing edge portion 216 of the movable surface 200. The movable surface 200 further includes an upper skin panel 250 and a lower skin panel 252 each coupled to the plurality of ribs 230 and the front spar 202. Furthermore, the movable surface 200 includes a plurality of bead stiffeners 300 coupled to an inner surface of the upper skin panel 250 and/or the lower skin panel 252. The bead stiffeners 300 within one or more of the bays 242 are spaced apart from each other and are oriented non-parallel to the front spar 202 and have a bead stiffener cap 304 having opposing cap ends 306 respectively located proximate the front spar 202 and the trailing edge portion 216.

Step 604 of the method 600 includes placing the movable surface 200 in a non-loaded condition. The non-loaded condition may be associated with the aircraft 100 being substantially non-moving (e.g., parked at a gate of an airport) and/or under a ground static loading in which the movable surface 200 is subjected to gravitational force due to the structural mass of the movable surface 200. The method 600 additionally includes step 606 of placing the movable surface 200 in a loaded condition wherein the aircraft 100 is in motion and the movable surface 200 is subjected to one or more dynamic loads. For example, the aircraft 100 in motion may subject the movable surface 200 to gravitational force and inertial forces due to the structural mass of the movable surface 200. Other examples of dynamic loads include aerodynamic loads on the movable surface 200 when the aircraft 100 is in flight, and/or loads on the movable surface 200 as a result of in-flight deflection of the movable surface 200 such as during deflection of an aileron 110 for roll control, deflection of a rudder 118 for yaw control, and/or deflection of an elevator 122 for pitch control of the aircraft 100.

The method 600 may additionally include removing and replacing the trailing edge wedge 220 from the movable surface 200. Advantageously, the trailing edge wedge 220 may be removably attached to the rear spar 204 by removing the mechanical fasteners 450 attaching the trailing edge wedge 220 to the rear spar 204. As mentioned above, the fasteners 450 may include threaded fasteners or non-threaded fasteners. Examples of threaded fasteners include screws, bolts, or other types of threaded fasteners which may be readily accessible for field removal of the trailing edge wedge 220 for repair and/or replacement.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A movable surface of an aircraft, comprising:
a front spar extending along a spanwise direction between opposing movable surface ends;
a plurality of ribs located at spaced intervals between the movable surface ends and defining a plurality of bays between adjacent pairs of the ribs, each rib extending between the front spar and a trailing edge portion of the movable surface;
an upper skin panel and a lower skin panel coupled to the plurality of ribs and the front spar; and
a plurality of bead stiffeners coupled to an inner surface of at least one of the upper skin panel and the lower skin panel, the bead stiffeners within the bays being spaced apart from each other and oriented non-parallel to the front spar and having a bead stiffener cap having opposing cap ends respectively locate proximate the front spar and the trailing edge portion;
wherein;
the upper and lower skin panels and the bead stiffeners are formed of fiber-reinforced polymer matrix material; and
the bead stiffeners within each bay of at least one of the upper and lower skin panels have a bead stiffness that prevents buckling respectively of the upper and lower skin panels up to a limit load on the movable surface, the limit load defined as a maximum aerodynamic pressure load to which the movable surface is subjected during in-flight deflection.

2. The movable surface of claim 1, further comprising:
a rear spar located proximate the trailing edge portion and extending between opposing movable surface ends;
at least some of the plurality of ribs extending between the front spar and the rear spar;
the upper skin panel and the lower skin panel coupled to the plurality of ribs, the front spar, and the rear spar; and
the opposing cap ends of each of the bead stiffeners respectively located proximate the front spar and the rear spar.

3. The movable surface of claim 2, further comprising:
a trailing edge wedge is removably attachable to the rear spar and extending along the spanwise direction of the rear spar.

4. The movable surface of claim 1, wherein:
at least one of the upper skin panel and the lower skin panel has a panel thickness that is constant along the spanwise direction between the movable surface ends.

5. The movable surface of claim 1, wherein:
the bead stiffener cap of at least some of the bead stiffeners has a rounded cross-sectional shape.

6. The movable surface of claim 1, wherein:
each bead stiffener has a bead bending stiffness that is approximately 40-60 percent of a combined bead-skin portion bending stiffness of the bead stiffener and a skin panel portion of the upper skin panel or lower skin panel supported by the bead stiffener; and
the skin panel portion having a panel portion width defined as one of the following:
the panel portion width extending between midpoints respectively located on opposite sides of the bead stiffener, each midpoint located midway between the bead stiffener and an immediately adjacent bead stiffener;
the panel portion width extending between a rib on one side of the bead stiffener and, on an opposite side of the bead stiffener, a midpoint between the bead stiffener and an immediately adjacent bead stiffener.

7. The movable surface of claim 1, wherein:
one or more of the ribs has a channel-shaped cross section having a rib web and an opposing pair of rib flanges;
the rib web and the rib flanges are comprised of fabric plies; and
the rib flange of at least one of the ribs having one or more 0-degree plies.

8. The movable surface of claim 1, wherein:
the front spar has a channel-shaped cross section having a spar web and an opposing pair of spar outer flanges;
the spar web and the spar outer flanges are comprised of fabric plies; and
the spar outer flange having one or more 0-degree plies.

9. The movable surface of claim 1, wherein:
the movable surface is an aileron.

10. A method of manufacturing a movable surface of an aircraft, comprising:
coupling a plurality of ribs to a front spar of a movable surface, each rib extending between the front spar and a trailing edge portion of the movable surface, the front spar extending along a spanwise direction between opposing movable surface ends of the movable surface, the ribs being located at spaced intervals between the movable surface ends and defining a plurality of bays between adjacent pairs of the ribs;
coupling a plurality of bead stiffeners to an inner surface of at least one of an upper skin panel and a lower skin panel of the movable surface, the bead stiffeners within the bays being spaced apart from each other at a spanwise spacing and having a bead stiffener cap having opposing cap ends respectively located proximate the front spar and the trailing edge portion; and
coupling the upper skin panel and the lower skin panel to the plurality of ribs and the front spar;
wherein;
the upper and lower skin panels and the bead stiffeners are formed of fiber-reinforced polymer matrix material; and
the bead stiffeners within each bay of at least one of the upper and lower skin panels have a bead stiffness that prevents buckling respectively of the upper and lower skin panels up to a limit load on the movable surface, the limit load defined as a maximum aerodynamic pressure load to which the movable surface is subjected during in-flight deflection.

11. The method of claim 10, further comprising:
coupling the upper skin panel and the lower skin panel to a rear spar located proximate the trailing edge portion and extending along a spanwise direction between the movable surface ends.

12. The method of claim 11, further comprising:
removably coupling a trailing edge wedge to the rear spar, the trailing edge wedge extending along the spanwise direction of the rear spar and defining the trailing edge portion.

13. The method of claim 10, wherein:
laying up a plurality of unidirectional plies to result in at least one of the upper skin panel and the lower skin panel having a panel thickness that is constant.

14. The method of claim 10, wherein:
laying up a plurality of fabric plies to result in the bead stiffeners each having a bead stiffener cap having a rounded cross sectional shape.

15. The method of claim 10, wherein:
laying up a plurality of fabric plies to result in the ribs having a channel-shaped cross section having a rib web and an opposing pair of rib flanges; and
interleaving one or more 0-degree plies within the fabric plies of the rib flanges.

16. The method of claim 10, further comprising:
laying up a plurality of fabric plies to result in the front spar having a channel-shaped cross section having a spar web and an opposing pair of spar outer flanges; and
interleaving one or more 0-degree plies within the fabric plies of the spar outer flanges one or more 0-degree plies.

17. The method of claim 10, wherein:
the movable surface is an aileron.

18. A method of loading a movable surface of an aircraft, comprising:
providing a movable surface, including:
a front spar extending between opposing movable surface ends;
a plurality of ribs located at spaced intervals between the movable surface ends and defining a plurality of bays between adjacent pairs of the ribs, each rib extending between the front spar and a trailing edge portion of the movable surface and oriented generally parallel to a chordwise direction of the movable surface;
an upper skin panel and a lower skin panel coupled to the plurality of ribs and the front spar;
a plurality of bead stiffeners coupled to an inner surface of at least one of the upper skin panel and the lower skin panel within one or more of the bays, the bead stiffeners within the bays being spaced apart from each other and having a bead stiffener cap having opposing cap ends respectively located proximate the front spar and the trailing edge portion;
wherein;
the upper and lower skin panels and the bead stiffeners are formed of fiber-reinforced polymer matrix material; and
the bead stiffeners within each bay of at least one of the upper and lower skin panels have a bead stiffness that prevents buckling respectively of the upper and lower skin panels up to a limit load on the movable surface, the limit load defined as a maximum aerodynamic pressure load to which the movable surface is subjected during in-flight deflection;
placing the movable surface in a non-loaded condition; and
placing the movable surface in a loaded condition.

19. The method of claim 18, wherein:
the non-loaded condition is associated with the aircraft being substantially non-moving and under a ground static loading in which the movable surface is subjected to gravitational force due to a structural mass of the movable surface; and
the loaded condition is associated with the aircraft in motion in which the movable surface is subjected to at least one of:
gravitational force and inertial force due to the structural mass of the movable surface; and
aerodynamic loads on the movable surface.

20. The method of claim 18, further comprising:
removing and replacing a trailing edge wedge attached to a rear spar of the movable surface.

* * * * *